United States Patent [19]

Callahan et al.

[11] Patent Number: 5,664,029

[45] Date of Patent: Sep. 2, 1997

[54] METHOD OF DISREGARDING CHANGES IN DATA IN A LOCATION OF A DATA STRUCTURE BASED UPON CHANGES IN DATA IN NEARBY LOCATIONS

[75] Inventors: Sean M. Callahan, Cupertino; Bruce A. Leak, Palo Alto, both of Calif.

[73] Assignee: Apple Computer, Inc., Cupertino, Calif.

[21] Appl. No.: 882,266

[22] Filed: May 13, 1992

[51] Int. Cl.⁶ .................................... G06K 9/40
[52] U.S. Cl. .................................... 382/260
[58] Field of Search .................... 382/49, 54, 56, 382/260, 261, 265, 302, 275, 236; 358/105; 348/154, 155, 400, 401, 402, 412, 413; H04N 7/15

[56] References Cited

U.S. PATENT DOCUMENTS

| | | | |
|---|---|---|---|
| 4,240,109 | 12/1980 | Michael et al. | 358/105 |
| 4,288,815 | 9/1981 | Miles | 358/105 |
| 4,558,302 | 12/1985 | Welch | 340/347 DD |
| 4,924,306 | 5/1990 | van der Meer et al. | 358/105 |
| 4,951,140 | 8/1990 | Ueno et al. | 358/136 |
| 5,046,119 | 9/1991 | Hoffert et al. | 382/56 |
| 5,177,794 | 1/1993 | Abe et al. | 382/48 |

FOREIGN PATENT DOCUMENTS

| | | | |
|---|---|---|---|
| 2031686 | 4/1980 | United Kingdom | 358/105 |

*Primary Examiner*—Andrew Johns
*Attorney, Agent, or Firm*—Blakely, Sokoloff, Taylor & Zafman

[57] ABSTRACT

A method for filtering data to be compressed by frame differencing is disclosed. In applications where large amounts of data must be either stored or transmitted, such as, for example, digital image data, various techniques are used to compress the data. One such technique is frame differencing wherein after a reference frame or key is encoded, only the differences between each frame and the immediately preceding frame in the sequence are encoded. The present invention operates as a pre-process or in conjunction with such a technique by determining which of the changed data points can be disregarded without significantly affecting, for example, the stored image, thereby reducing the amount of data which must be stored or transmitted. The determination is made in the present invention by comparing the pattern of changed data points in the vicinity of the data point under consideration with a set of pre-determined patterns.

23 Claims, 4 Drawing Sheets

|   |   | J |   |   |
|---|---|---|---|---|
|   | a | A | b |   |
| M | D | X | C | L |
|   | d | B | c |   |
|   |   | K |   |   |

FIGURE 4a

| ABCD | Decimal Value of ABCD: | Mask To Apply To Locations a b c d |
|------|------------------------|------------------------------------|
| 0 0 0 1 | 1  | 1 0 0 1 |
| 0 0 1 0 | 2  | 0 1 1 0 |
| 0 0 1 1 | 3  | 1 1 1 1 |
| 0 1 0 0 | 4  | 0 0 1 1 |
| 0 1 0 1 | 5  | 1 0 1 1 |
| 0 1 1 0 | 6  | 0 1 1 1 |
| 0 1 1 1 | 7  | 1 1 1 1 |
| 1 0 0 0 | 8  | 1 1 0 0 |
| 1 0 0 1 | 9  | 1 1 0 1 |
| 1 0 1 0 | 10 | 1 1 1 0 |
| 1 0 1 1 | 11 | 1 1 1 1 |
| 1 1 0 0 | 12 | 1 1 1 1 |
| 1 1 0 1 | 13 | 1 1 1 1 |
| 1 1 1 0 | 14 | 1 1 1 1 |
| 1 1 1 1 | 15 | 1 1 1 1 |

FIGURE 4b

METHOD OF DISREGARDING CHANGES IN DATA IN A LOCATION OF A DATA STRUCTURE BASED UPON CHANGES IN DATA IN NEARBY LOCATIONS

BACKGROUND OF THE INVENTION

1. Field of the Invention

The present invention relates to a method of filtering data. More particularly, in its preferred embodiment, the present invention relates to a lossy filtering operation for image data to be used in conjunction with or as a preprocess to other compression techniques.

2. Prior Art

The benefits of compressing data are well-known. Compressing data in some instances saves storage space while in other instances it reduces data transmission time. Numerous techniques are known in the prior art for compressing and decompressing digital video data. For example, see U.S. Pat. No. 5,046,119 entitled "Method and Apparatus For Compressing and Decompressing Color Video Data With An Anti-Aliasing Mode" assigned to the assignee of the present invention. U.S. Pat. No. 5,046,119 describes a digital compression technique that is termed lossy. Lossy data compression techniques concede a certain amount of lost accuracy of the image being represented in exchange for increased compression of the data. Lossy compression techniques have proven to be effective when applied to graphical or video images and digitized audio data. Such lossy techniques operate on the premise that a certain amount of loss of accuracy is acceptable to efficiently represent an image or audio, i.e. analog, source in a digital format. Other lossy compression techniques for video image data are discussed by Nelson in *The Data Compression Book*, M&T Books, a division of M&T Publishing, Inc., pp. 347–408, (1992).

Other known data compression techniques exactly replicate the original source data on decompression. Such data compression techniques are termed lossless. For example, see U.S. Pat. No. 4,558,302 entitled "High Speed Data Compression And Decompression Apparatus And Method". In a lossless data compression method, none of the data is lost during compression. Lossless data compression techniques, are typically used for storing or transmitting textual data. Besides U.S. Pat. No. 4,558,302, known lossless compression techniques include Huffman coding and various derivative works on the well-known Lempel-Ziv compression algorithms.

One such compression technique is known as frame differencing. In this technique, a reference frame is encoded by storing pixel data for each pixel location in a frame. The pixel data may be, for example, in a black and white display, a single bit indicating whether the pixel is on or off. In a display having various shades of grey, the data may comprise several bits and indicate the grey scale number. In a color display, the data for each pixel indicates the intensity for each of the three components red, green, and blue (RGB). The pixel data may indicate the state or intensity level of each pixel location directly, or it may be an index number which refers to a stored table of, for example, RGB color levels associated with each index number.

To compress the data by frame differencing, the pixel data in a reference frame is encoded. The next frame (a "frame differenced" frame) is encoded by recording the pixel data only for those pixel locations which have changed pixel data from the reference frame. Since from frame to frame there is usually a large number of pixels that do not change, this frame differencing technique greatly reduces the amount of data which must be stored and/or transmitted for a sequence of frames. Frame differencing techniques usually require that a pixel data for a pixel location change beyond a certain threshold in order for the pixel data to be considered changed from one frame to the next. Therefore, frame differencing is a lossy compression technique. In addition, the reference frame itself can be encoded using one or more lossy or lossless techniques.

What is needed is a technique for reducing the number of changed pixels which must be stored without significantly reducing the perceptual quality of the stored or transmitted image.

SUMMARY OF THE INVENTION

A method of filtering data to be frame differenced is disclosed. In the method of the present invention, the pixels surrounding a changed pixel are examined to determine which of the surrounding pixels have changed. If the changed pixel and the surrounding pixels which have changed form any one of a predetermined set of patterns, the changed pixel under consideration is disregarded and no data is stored for this pixel in the frame differenced frame.

DETAILED DESCRIPTION OF THE PRESENT INVENTION

A method of filtering data to be frame differenced is disclosed. In the following description, numerous specific details are set forth, such as specific pixel comparison formulas, specific pixel patterns, etc., in order to provide a thorough understanding of the present invention. In other instances, well known methods are not described in detail in order to avoid unnecessarily obscuring the present invention. Also, although the present invention is described in conjunction with a sequence of frames of image data, the teachings of the present invention can be utilized to filter or compress any type of data. Furthermore, although the present invention is described in conjunction with data which is compressed by encoding one or more reference frames or samples and encoding only the changes to the reference frame for subsequent frames, the teachings of the present invention can be utilized in other applications where no such compression occurs or where other compression techniques are utilized.

1. Overview Of A Computer System In A Preferred Embodiment

Figure 1:
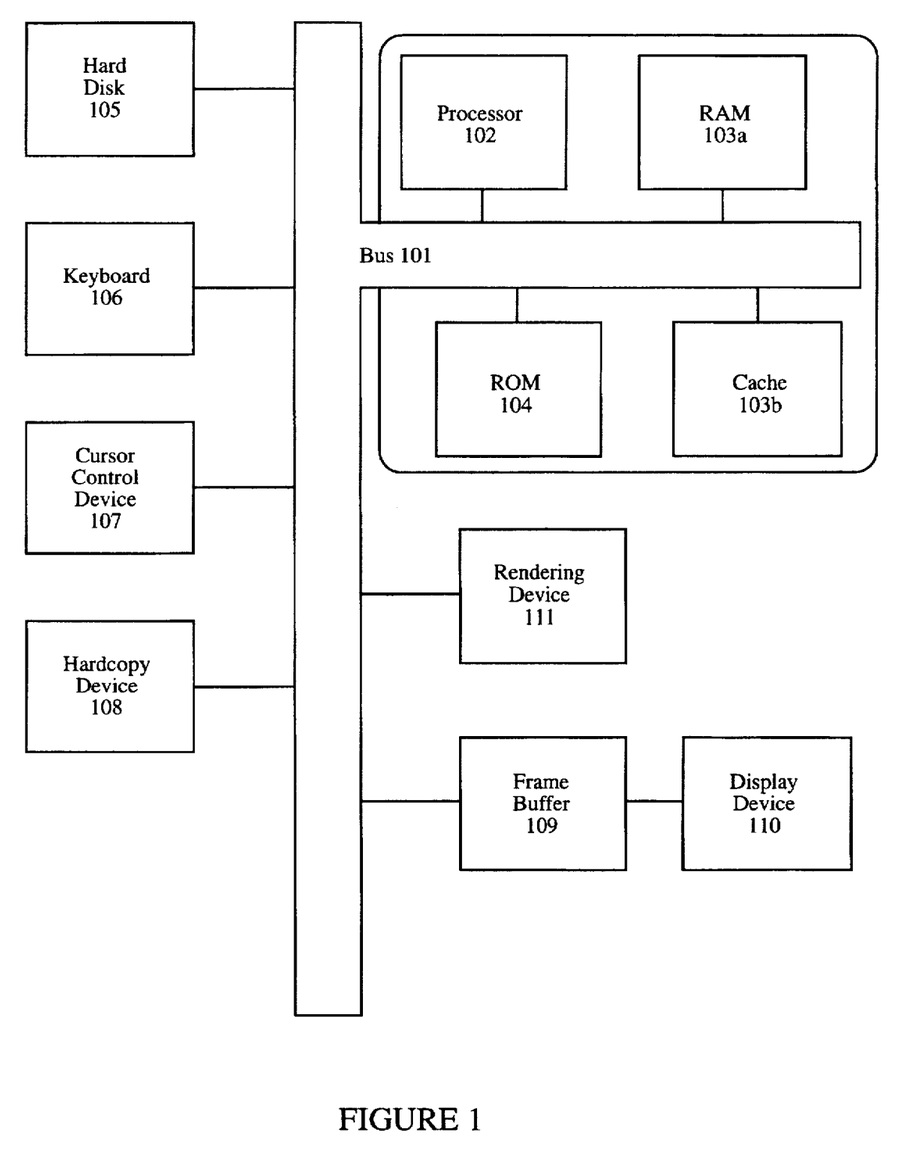
FIG. 1 illustrates a block diagram of a computer system which may embody a currently preferred embodiment of the present invention.

The computer system of the preferred embodiment is described with reference to FIG. 1. The present invention may be implemented on a general purpose microcomputer, such as one of the members of the Apple® Macintosh® family, one of the members of the IBM Personal Computer family, or one of several work-station, multi-user, or graphics computer devices which are presently commercially available. In any event, a computer system as may be utilized by the preferred embodiment generally comprises a bus or other communication means 101 for communicating information, a processing means 102 coupled with bus 101 for processing information, a random access memory (RAM) or other storage device 103a (commonly referred to as a main memory) coupled with bus 101 for storing information and instructions for processor 102, a cache memory 103b for storing frequently accessed data and/or data that must be quickly accessed, a read only memory (ROM) or other static storage device 104 coupled with bus 101 for storing static information and instructions for processor 102, a data storage device 105, such as a magnetic disk and disk drive, coupled with bus 101 for storing information and instructions, an alphanumeric input device 106 including alphanumeric and other keys coupled to bus 101 for communicating information and command selections to processor 102, a cursor control device 107, such as a mouse, track-ball, cursor control keys, etc, coupled to bus 101 for communicating information and command selections to processor 102 and for controlling cursor movement. As will be appreciated by one skilled in the art, data storage device 105, alphanumeric input device 106, and cursor control device 107 are not coupled directly to bus 101 but are coupled to bus 101 through an input/output (I/O) controller, which is not shown in FIG. 1. Additionally, it is useful if the system includes a hardcopy device 108, such as a printer, for providing permanent copies of information. The hardcopy device 108 is coupled with the processor 102 through an I/O controller through bus 101.

Also coupled to the computer system of the preferred embodiment is a frame buffer 109 which is further coupled to a display device 110, preferably a display device capable of displaying color graphics images. The frame buffer 109 contains the pixel data for driving the display device 110. In some implementations, the display device 110 may be optionally coupled to a rendering device 111, also known as a graphics accelerator. Typically, such a rendering device 111 is coupled to the bus 101 for communication with the processor 102 and frame buffer 109. Optionally, frame buffer 109 may be coupled to the bus 101 through rendering device 111. A preferred embodiment is implemented for use on a Macintosh computer available from Apple Computer, Inc. of Cupertino, Calif. However, the present invention can be practiced on any type of computer, including those described earlier, where a data compression technique is practiced. For a description of a data compression and decompression technique, see co-pending U.S. patent application Ser. No. 07/881,770, filed May 2, 1992, entitled "A Method And Apparatus For Real-Time Lossless Compression And Decompression Of Image Data", which application is assigned to the assignee of the present application.

2. Overview Of Frame Differencing

In the embodiment described below, the present invention is described as a pre-process to a frame differencing compression technique. It will be obvious, however, that the present invention can be practiced without the use of a frame differencing compression technique. If used in conjunction with such a technique, the present invention need not necessarily be practiced as a pre-process but can also be practiced at the same time as a frame-differencing technique, or as a post process to such a technique. Optionally, other compression techniques can be applied in addition to frame differencing. Since the present invention does not require reconstruction or approximation of the data which has been filtered out, the practice of the present invention generally will have no effect on the decompression methods and apparatus used when it is desired to decompress and display or transmit the data. Furthermore, although the present invention is described in conjunction with the compression for storage of the compressed data, the present invention can be practiced in situations where, after the practice of the present invention, frame differencing, and any other compression techniques, the data is not stored but is, for example, transmitted to another location for decompression and display in real time.

As will be obvious to one skilled in the art, the present invention can be practiced on any sequence of data which is to be compressed by comparing one of a series of sequential samples or frames to the previous sample or frame and recording only the data points which are different, beyond some threshold, from the previous sample or frame. In a preferred embodiment, the present invention is practiced upon image data which is to be compressed by frame differencing. As used herein, image data includes any type of digital data used to create an image on an output device, including digitized video signals, graphics of any type, whether computer generated or digitized from an analog source, and animation.

In a currently preferred embodiment and the description that follows, each frame comprises a plurality of data locations having pixel data associated therewith. Each data location corresponds to a pixel on a display device, identified, for example, by x,y coordinates. The pixel data contained in a given data location in a frame indicates whether the corresponding pixel is on or off for a black and white display; shade of grey, for a display device having grey scale capability; or color for a color display, for the frame under consideration. The pixel data in the frames can be either "direct" or "indexed." If direct, the data associated with each location gives the on/off state, grey scale intensity, or intensity of each color component (e.g., red, green, and blue) directly for the corresponding pixel. For example, if the pixel data is 16 bit direct, then there are 5 bits which give red intensity, 5 bits which give green intensity, and 5 bits for blue, with one bit unused. If the pixel data is indexed, the data associated with each location in a frame gives the address of the look-up table which contains the intensity data of the pixel in the corresponding location. In the present specification, a change in pixel data refers to a change in the actual intensity values. Thus, if the pixel data is indexed, the change in pixel data for a given location from one frame to the next is determined from the looked-up values and not the index numbers. Although the present invention can be applied to image data of any pixel depth (number of bits/pixel), it is preferably used with pixel data which is 8 bit indexed, 16 bit direct, and 24 bit direct image data. The present invention may be used with lower pixel bit depths, but since there is less data with lower bit depths, a change in the pixel data contains a large amount of information, and it may not be desirable to disregard such changes.

In the frame differencing compressor used in conjunction with the present invention, the first frame of the sequence is a reference or key frame. The key frame itself may be compressed, by any type of compression technique either separate from or in conjunction with the frame differencing utility. In any event, for the reference frame, the pixel data for all (if a lossless compression technique is used) or nearly all (if a lossy compression technique is used) of the pixels is encoded. Subsequent frames are encoded by storing only the pixel data which has changed from the previous frame.

3. Overview Of The Present Invention

Figure 3A:
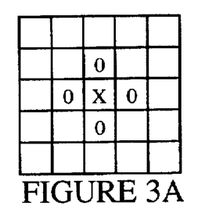
FIGS. 3a–p illustrate the reference patterns of changed pixels surrounding a pixel under consideration to determine if the pixel under consideration should be disregarded.
Figure 3B:
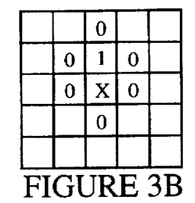
Figure 3C:
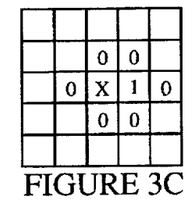
Figure 3D:
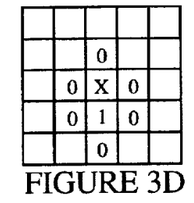
Figure 3E:
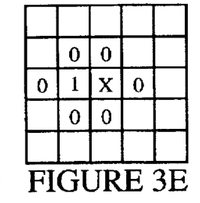

It has been found that if the pixel data for a given location has changed from one frame to the next, the change in that pixel data can be disregarded in that next frame without significantly affecting the perceptual quality of the image, if the pattern of surrounding locations having pixel data which has changed meets one of a pre-determined set of patterns. In the present specification, a location for which the corresponding pixel data has changed from one frame to the next will be referred to as a "changed pixel." The determination of whether a change has occurred will be discussed more fully below. Generally speaking, if the changed pixel under consideration has no pixels on an adjacent side which have changed; or if the changed pixel under consideration has from one to three pixels on an adjacent side which have changed, but no pixels adjacent to any of the adjacent changed pixels and pixel under consideration which have changed; or if the pixel under consideration has changed pixels on all four adjacent sides and no pixels adjacent to the four adjacent changed pixels which have changed, then the change in the pixel under consideration can be disregarded in that frame. In the present specification, an adjacent pixel is one which is adjacent along the left or right side of a pixel or along the top or bottom of a pixel. Thus, a pixel is not considered adjacent to any pixels in a diagonal direction. Referring briefly to FIGS. 3a–p, the patterns meeting one of the above criteria are illustrated.

It should be noted that not all of the patterns of FIG. 3a–p need to be utilized. If desired, a smaller subset can be used consisting of any number of the patterns shown. For example, reference patterns allowing a pixel under consideration having several adjacent changed pixels to be disregarded can be eliminated, so that only very isolated changed pixels are disregarded. Furthermore, other, more complex, patterns could be added to the reference set so that more changed pixels are disregarded. The patterns which would allow for greater compression (i.e. more changed pixels disregarded) while providing for satisfactory image quality will depend on the particular application. It has been found that use of all of the reference patterns of FIGS. 3a–p successfully disregards a significant number of pixels which have changed due to noise introduced, for example, by a digitization process, anti-aliasing techniques, and other sources. Thus, while some changed pixels which form part of the image may be disregarded by the present invention, use of the patterns shown in FIGS. 3a–p, as well as other similar patterns, does not result in noticeable impact on the image quality. If other patterns are added to the reference set, the pattern of changed pixels surrounding the pixel under consideration preferably should not contain a large number of changed pixels in a vertical or horizontal line as this may result in the elimination of, for example, small, quickly moving objects in the sequence of images. Also, other reference patterns preferably should not allow a changed pixel to be disregarded which is adjacent to a large block of changed pixels as the quality of the image may be seriously degraded. Patterns such as those shown in FIGS. 3a–p, which eliminate relatively isolated pixels, are effective at eliminating changed pixels which occurred due to noise, or which are imperceptible because they are located at the outer edges or fringes of objects in the image.

In the present invention, a determination must be made as to which pixels have changed from frame N−1 to frame N. As mentioned earlier, the pixel data under consideration refers to the shading or color values contained therein. Thus, if the frames contain index numbers, it is the corresponding shading or color values which are looked up and compared. In a black and white display, the data for a pixel is either a 1 or a 0 (on or off), and the pixel has changed from frame N−1 to frame N if the pixel data has changed from a 1 to a 0 or from a 0 to a 1.

In the present invention, where the pixel data consists of grey scale or color components values, the pixel data must change beyond a certain threshold for the pixel to be considered changed. If the pixel data consists of grey scale numbers, each pixel data is generally 8 bits deep, providing for 256 shades of grey. To determine whether a pixel has changed the difference in value of the pixel data for a pixel location between frame N−1 and frame N is calculated and compared to a threshold value. If the difference is greater than the threshold, the pixel is considered changed. If it is less than or equal to the threshold, the pixel will be considered unchanged. In a currently preferred embodiment, the threshold for 8-bit grey scale pixel data is in the range of 2–10 and is preferably approximately 6.

If the pixel data consists of color data, a three dimensional color distance calculation is performed to determine if the pixel has changed. In a currently preferred embodiment, 24 bit direct pixel data, with eight bits each for red, green, and blue, is utilized. The magnitude of the change is calculated by the following formula:

$$(N_{red}-(N-1)_{red})^2+(N_{green}-(N-1)_{green})^2+(N_{blue}-(N-1)_{blue})^2$$

where $(N-1)_{red}$ equals the value of the red component of the pixel location under consideration in frame N−1, $(N)_{red}$ equals the value of the red component for the same pixel location in frame N, and so on.

The threshold value to use to determine when a pixel has changed can be determined best by trial and error for a given application and will depend on the pixel depths, desired visual quality of the filtered image, and patterns used in determining which pixel changes should be disregarded, among other factors. In a currently preferred embodiment, the threshold for 8 bit per component pixel data is in the range of approximately $2^2$ through $10^2$ and is preferably approximately $6^2$. Thus, if the sum of the squares of differences in color values between frame N−1 and frame N for a given location is greater than, for example, $6^2$, the pixel will be considered changed in frame N. If the above sum is less than or equal to $6^2$, the pixel will be considered unchanged.

4. Process Flow Of The Present Invention

Figure 2:
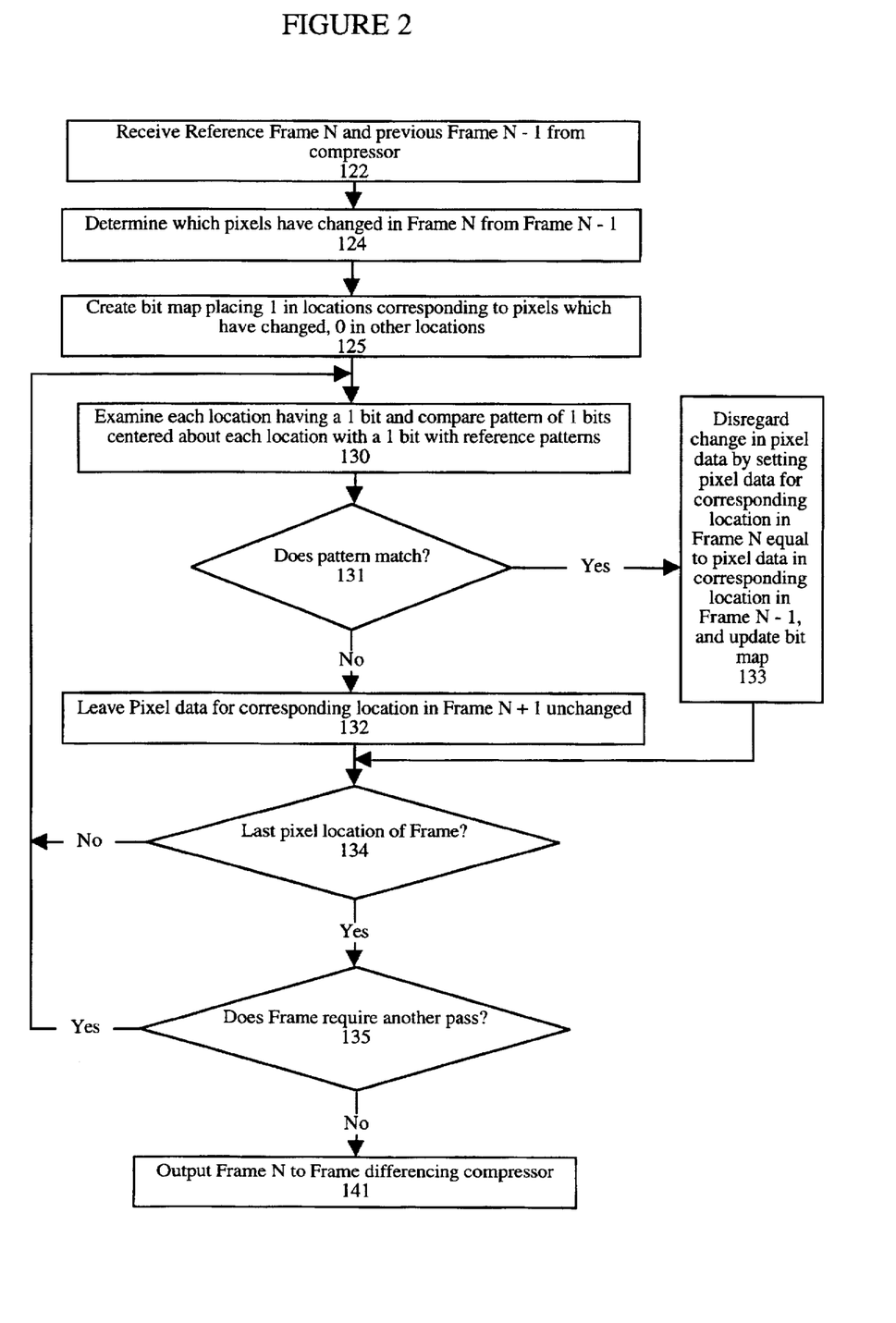
FIG. 2 is a flow chart which illustrates the method of a currently preferred embodiment of the present invention.

FIG. 2 shows a flow chart of a currently preferred embodiment of the present invention. As shown in step 122, the frame differencing compressor described earlier sends frame N, the next frame in the sequence to be frame differenced, and frame N−1, the immediately preceding frame in the sequence, through the process flow of FIG. 2.

In step 124, each pixel location is examined to determine whether the pixel has changed from frame N−1 to frame N. This determination is made as described earlier.

Next, as shown in step 125, a data structure is created to record which pixels have changed. In a currently preferred embodiment, a single-byte (8 bit) bit map with each location corresponding to a pixel location, is utilized. For each location having a changed pixel, an "ff" is placed in the corresponding location in the bit map. If the pixel has not changed, a 0 is placed in the corresponding location in the bit map. An 8-bit bit map is utilized in the preset invention to facilitate the comparison between the bit map and the reference patterns of FIG. 3. However, a single-bit bit map could also be utilized. For simplicity, in the following discussion, it will be assumed that a single-bit bit map is used with a 1 placed in locations which have changed and a 0 placed in locations which have not changed. In the present invention, a 1 or a 0 is placed in the bit map after each pixel location is examined for a change so that steps 124 and 125, shown as two steps in FIG. 2 for illustration, are carried out together in a currently preferred embodiment.

Referring to step 130 of FIG. 2, each changed pixel is examined by the method of the present invention to determine if the pixel should be considered not changed for the purpose of frame differencing. This determination is made based upon the pattern of changed pixels surrounding the changed pixel under consideration. At this point in the processing, the determination of whether a pixel is to be considered for removal because it has changed as well as the determination of the pattern formed by surrounding changed pixels is made by reference to the above-described bit map. For simplicity, when discussing changed pixels with reference to the bit map, the "1"s in the bit map will be referred to as changed pixels, and the "0"s will be referred to as unchanged pixels. It should be borne in mind, however, that the bit map does not itself contain pixel data, and any reference to which pixels are changed or unchanged for a given location in the bit map is a shorthand way of saying that the pixel data in the corresponding location in frame hi has changed in value (beyond the above described threshold) from the pixel data in that same corresponding location in frame N−1.

In a currently preferred embodiment, after the bit map for frame N has been created in steps 124 and 125 of FIG. 2, the bit map is scanned in step 130 from top left to bottom right searching for changed pixels (i.e. searching for "1"s). As will be obvious to one skilled in the art, this order of scanning is not required, and other scanning orders can be used. Next, when a changed pixel is found, it is considered for removal by comparing the pattern formed by it and the surrounding pixels to a set of reference patterns. As used in the present application, "removal" of or "disregarding" a pixel means that the pixel data for that location in frame N is to be considered unchanged from the pixel data for that location in the previous frame N−1, so that for the purpose of the frame differencing utility, no data for that pixel location will be encoded in the frame differenced frame N.

The bit map of the present invention is created in strips five lines high. After a given line is scanned for changed pixels, the top line is disregarded and a new bottom line is created. For example, if line 30 is being scanned, the bit map will have five lines corresponding to lines 28–32 of the frames. After line 30 is scanned, the bit map will be updated to have five lines corresponding to lines 29–33 of the frames in order to scan line 31.

A currently preferred embodiment uses the reference patterns shown in FIGS. 3a–p. In each reference pattern, the square having an "X" represents the location of the changed pixel under consideration, squares having a 1 represent the locations of other nearby pixels which have changed in each pattern, and squares having a 0 represent pixels which must not have changed in order for the pixel under consideration to match that pattern and, therefore, be disregarded. The pattern in the bit map around the pixel under consideration is compared with each of the patterns in FIGS. 3a–p. Thus, for example, if the changed pixel under consideration has no changed pixels on any adjacent side, it matches the pattern shown in FIG. 3a. If the changed pixel under consideration has a changed pixel to its right, but neither it nor the changed pixel to the right have any changed pixels adjacent to the three remaining sides, then it matches the pattern shown in FIG. 3c.

Next, as shown by step 131, processing proceeds to step 132 if the pattern surrounding the pixel under consideration does not match any of the reference patterns, or to step 133 if the pattern surrounding the pixel under consideration does match one of the reference patterns. If there is no match, then, as indicated by step 132, the pixel data for the pixel location in frame N corresponding to the location of the pixel under consideration in the bit map is left unchanged. Therefore, since the pixel data has changed for that pixel between frames N−1 and N, the method of the present invention will not cause the changed pixel under consideration to be disregarded, and when frame N is frame differenced, the pixel will be encoded as as changed pixel. Of course, the frame differencing utility may have its own threshold to determine whether a pixel has changed. If that threshold is higher than that used in the method of the present invention, then the frame differencing utility may disregard changed pixels which are not disregarded by the method of the present invention.

If the pattern surrounding the pixel under consideration does match any one of the reference patterns, then, as shown by step 133, the change in that pixel is disregarded. This is accomplished by setting the pixel data for the corresponding location in frame N equal to the pixel data for the corresponding location in frame N−1. Thus, when the frame differencing utility compares the pixel data for that location, it will see no difference between frame N−1 and frame N for that pixel, and that pixel will not be encoded as a changed pixel in frame N. It is in this way that the method of the present invention causes changed pixels to be disregarded when frame differenced. Alternatively, in step 133, changed pixels which are to be disregarded could be flagged, and the frame differencing utility could be implemented in such a way that it ignores flagged pixels.

After a pattern match has been established and it is determined that the change in the pixel under consideration is to be disregarded, the bit map for frame N is updated to place a "0" in the corresponding location to indicate that the pixel data for the corresponding location has not changed.

Next, as indicated in step 134, a determination is made as to whether the pixel under consideration was the last pixel of the frame. If not, processing returns to step 130 where the bit map continues scanning left to right, top to bottom for the next changed pixel (next "1" in the bit map). Each changed pixel is then examined as described above to determine whether it should be disregarded. It should be noted that although step 130 compares the pattern of changed pixels surrounding the pixel under consideration, only the pixel under consideration, and not the other surrounding changed pixels in the pattern, are disregarded. Of course, these other pixels may be disregarded when they are under consideration in step 130 depending upon the pattern of changed pixels surrounding them.

Next, as indicated by step 135, a determination is made as to whether frame N requires another pass through steps 130–134. In the currently preferred embodiment, two passes through steps 130–134 are carried out. Thus, in step 135, all that needs to be determined is whether frame N went through steps 130–134 once or twice. Two passes are performed because not all of the changed pixels in bit map patterns identical to the more complex patterns of changed pixels shown in FIG. 3 will necessarily be disregarded in a first pass. For example, if the bit map contained the pattern shown in FIG. 3p, the four pixels adjacent to the pixel in the center will not be disregarded until after the center pixel has been disregarded and a "0" has been placed in that location. After that, each of the four remaining pixels will match the pattern shown in FIG. 3a and will be disregarded. The pixel to the right and the pixel below the center pixel will be eliminated in the first scan since the center location in the bit map is updated before the scan proceeds left to right and top to bottom. However, the second scan is needed to disregard the pixel to the left of the center and the pixel above the center.

If frame N has gone through steps 130-134 only once, then the frame N is processed through steps 130-134 a second time.

If frame N has gone through steps 130-134 twice, then frame N is output to the frame differencing compressor to be frame differenced, with the pixel data from frame N-1 written into the corresponding locations in frame N where it has been determined that the change in pixel data can be disregarded.

5. Pattern Comparison Implementation Details

Figure 4A:
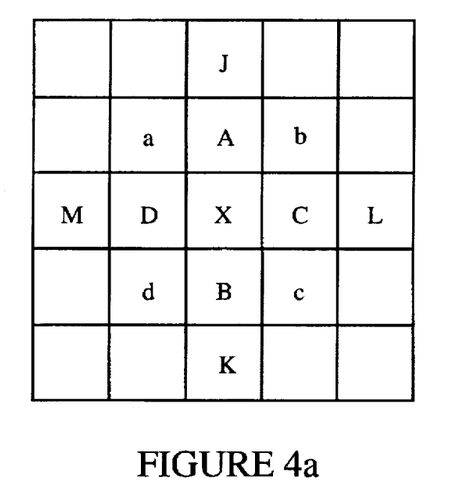
FIGS. 4a and 4b give the details of the implementation of the comparison of the pattern surrounding the pixel under consideration with the patterns of FIGS. 3a–p.
Figure 4B:
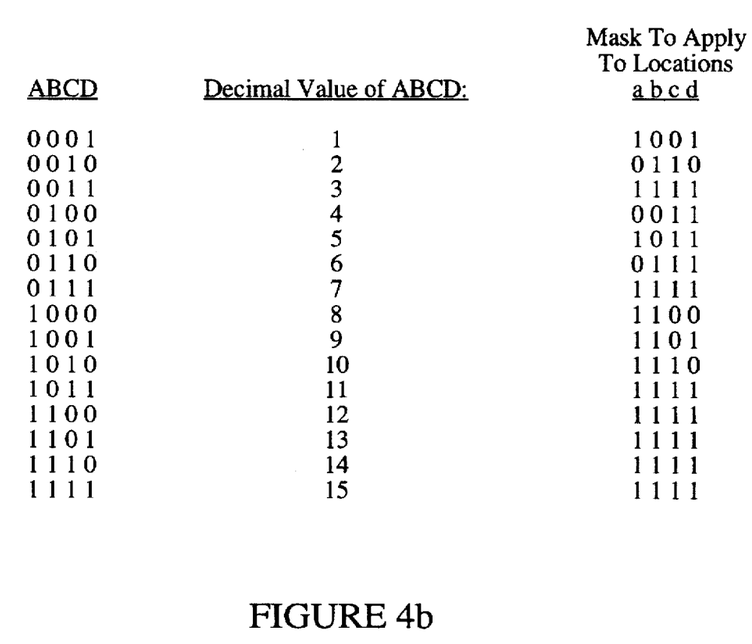

The comparison of the pattern of changed pixels surrounding the pixel under consideration which takes place in step 130 of FIG. 2 is described in reference to FIGS. 4a and 4b. As noted above, a bit map having locations corresponding to the locations of the pixel data in the frames of image data is preferably utilized. However, such a bit map is not required, and the comparison described below could be made repeatedly while applying the method the present invention to a pixel under consideration without utilizing a bit map. As a further alternative, the method of the present invention could be practiced as a part of the frame differencing utility.

In a currently preferred embodiment, the bit map has two extra rows of locations on the top and bottom, and two extra columns of locations on both sides, which are all filled with "0"s. This allows for pixel locations in the first and last two rows and columns to be compared to the described patterns. Therefore, for example, a pixel under consideration in a top row location would always be considered to have unchanged pixels in the locations above it.

Referring to FIG. 4a, X represents a location in the bit map corresponding to a changed pixel under consideration for removal. The letters A-D, a-d, and J-M identify all locations in the bit map which may be used in the comparison to the patterns shown in FIGS. 3a-p.

First, a four bit value ABCD composed of the bit values in the A, B, C, and D locations in the bit map is determined. Thus, for example, the ABCD value for a bit map pattern which matches the reference pattern FIG. 3a would be 0000, the ABCD value for a bit map pattern of which matches the reference pattern shown in FIG. 3j would be 1011, and so on. If the ABCD value of a location X in the bit map is 0000, matching the pattern shown in FIG. 3a, the pixel in the location labeled X is disregarded without further consideration.

If the ABCD value is not 0000, the ABCD value, in decimal form, is used to look up a four bit mask. This mask will be applied to the four bit value composed of the bit values in the a, b, c, and d locations in the bit map. The four bit mask for each decimal value of ABCD is given in FIG. 4b.

The four bit mask gives, for a given ABCD value, which bits in the bit map locations a, b, c, and d must be zero in order for the pixel in location X to remain under consideration to be disregarded. On the mask, a "1" means the bit in the corresponding a, b, c, or d location of the bit map must be zero for the pixel X to remain in consideration for removal.

Figure 3F:
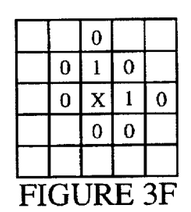
Figure 3G:
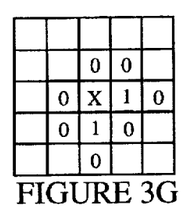
Figure 3H:
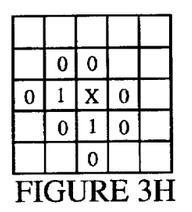
Figure 3I:
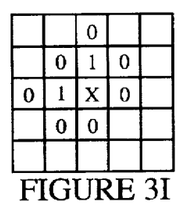
Figure 3J:
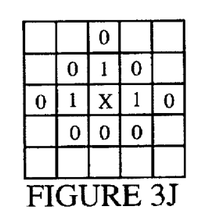
Figure 3K:
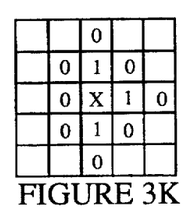
Figure 3L:
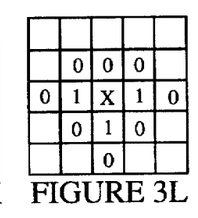
Figure 3M:
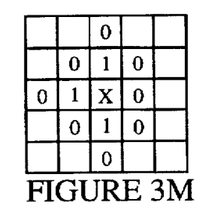
Figure 3N:
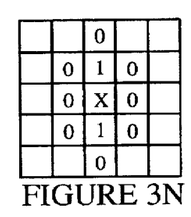
Figure 3O:
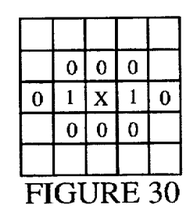
Figure 3P:
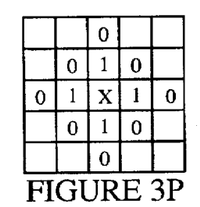

For example, a bit map pattern which matches the reference pattern in FIG. 3f has an ABCD value of 1010, giving a decimal value of 10. Therefore, the mask to be applied to the abcd value, for an ABCD value of 1010, is 1110. This means that the bits in the locations labeled a, b, and c must be 0 to pass this portion of the test so that the pixel in the position marked X remains under consideration. As can be seen from FIG. 3f, the pattern shown therein has "0"s in the locations corresponding to the a, b, and c locations of FIG. 4a, while the location in FIG. 3f corresponding to location d in FIG. 4a is not considered.

After a mask has been retrieved from the table of FIG. 4b based on the ABCD value, a logical AND operation between the mask and the abcd value is performed. If the result of the AND operation contains any "1" bits, this part of the test is failed, and the pixel in the location marked X is no longer under consideration to be disregarded. The above described table of masks and AND operation duplicates the following logic:

if A=1 AND (a=1 OR b=1) then fail
if B=1 AND (c=1 OR d=1) then fail
if C=1 AND (b=1 OR c=1) then fail
if D=1 AND (d=1 OR a=1) then fail If the above part of the test is passed, the pixel in the X location of FIG. 4a remains under consideration for removal. A four bit value JKLM is then created composed of the bit values in the locations marked J, K, L, and M. Next, a logical AND operation is performed between the ABCD value and the JKLM value. If the result of this AND operation contains any 1 bits, then this portion of the test has failed. If the result contains no 1 bits, then this second test is also passed. The second part of the test corresponds to the following logic:

if A=1 AND J=1 then fail
if B=1 AND K=1 then fail
if C=1 AND L=1 then fail
if E=1 AND M=1 then fail If both of the above described tests are passed, then the change in the pixel data in the location marked X from frame N-1 to frame N is disregarded as described earlier.

Returning to the example of a bit map pattern which matches the reference pattern of 3f, the JKLM value (assuming a 1 in all locations not marked 0) will be 0101. When this is ANDed with ABCD value of 1010 from above, the result is 0000. Thus, a bit map pattern which matches the reference pattern of FIG. 3f passes both portions of the test and the change in the pixel location corresponding to the location of X in the bit map will be disregarded.

Thus, a method for filtering data which is to be compressed using a frame differencing technique is described.

We claim:

1. A method of filtering a signal comprising a sequence of frames used in conjunction with a frame differencing technique, said frames having a plurality of corresponding data locations, each of said data locations having data associated therewith, wherein said signal comprises an image signal and said data comprises pixel data, said method comprising the steps of:

comparing said data associated with a first location in a first frame with said data associated with said first location in a second frame;

determining whether a change in said data associated with said first location has occurred between said first frame and said second frame;

determining whether a change in said data between said first frame and said second frame in a predetermined group of locations proximate said first location has occurred, if a change in said data associated with said first location has occurred, to form a pattern of locations wherein said data has changed;

comparing said pattern with at least one predetermined reference pattern; and, disregarding said change between said first and said second frames in said data associated with said first location if said pattern matches one of said at least one predetermined reference pattern by copying said pixel data from said first location in said first frame to said first location in said second frame.

2. The method as described in claim 1 wherein said determining whether a change in said pixel data has occurred is performed by computing a difference between grey scale values associated with said pixel data, comparing said difference to a grey scale threshold value and determining that said change has occurred if said difference exceeds said grey scale threshold value, if said pixel data comprises grey scale values, and wherein said determining whether a change in said pixel data has occurred is performed by computing a sum of squares of a difference between between each of a plurality of color component values associated with said pixel data, comparing said sum with a color threshold value and determining that said change has occurred if said difference exceeds said color threshold value, if said pixel data comprises color component values.

3. The method as described in claim 1 wherein said at least one predetermined reference pattern comprises the patterns of:
all locations adjacent said first location not having a change in pixel data associated therewith;
one location adjacent said first location having a change in pixel data associated therewith and remaining locations adjacent said first location and adjacent said one location adjacent said first location not having a change in pixel data associated therewith; and,
two locations adjacent said first location having a change in pixel data associated therewith and remaining locations adjacent said first location and adjacent said two locations adjacent said first location not having a change in pixel data associated therewith.

4. The method as described in claim 3 wherein said at least one predetermined reference pattern further comprises the patterns of:
three locations adjacent said first location having a change in pixel data associated therewith and remaining locations adjacent said first location and adjacent said three locations adjacent said first location not having a change in pixel data associated therewith; and,
four locations adjacent said first location having a change in pixel data associated therewith and remaining locations adjacent said four locations adjacent said first location not having a change in pixel data associated therewith.

5. The method as described in claim 4 wherein said method is performed for each of said plurality of corresponding locations.

6. The method as described in claim 1 wherein said method is performed for each of said plurality of corresponding locations.

7. A method of filtering a signal comprising a sequence of frames, said frames having a plurality of corresponding data locations, each of said data locations having data associated therewith, said method comprising the steps of:
comparing said data associated with a first location in a first frame with said data associated with said first location in a second frame;
determining whether a change in said data associated with said first location has occurred between said first frame and said second frame;
determining whether a change in said data between said first frame and said second frame in a predetermined group of locations proximate said first location has occurred, if a change in said data associated with said first location has occurred, to form a pattern of locations wherein said data has changed;
comparing said pattern with at least one predetermined reference pattern; and,
disregarding said change between said first and said second frames in said data associated with said first location if said pattern matches one of said at least one predetermined reference pattern;
wherein said signal comprises an image signal and said data comprises pixel data; and
wherein said at least one predetermined reference pattern comprises the patterns of:
all locations adjacent said first location not having a change in pixel data associated therewith;
one location adjacent said first location having a change in pixel data associated therewith and remaining locations adjacent said first location and adjacent said one location adjacent said first location not having a change in pixel data associated therewith; and,
two locations adjacent said first location having a change in pixel data associated therewith and remaining locations adjacent said first location and adjacent said two locations adjacent said first location not having a change in pixel data associated therewith.

8. The method as described in claim 7 wherein said at least one predetermined reference pattern further comprises the patterns of:
three locations adjacent said first location having a change in pixel data associated therewith and remaining locations adjacent said first location and adjacent said three locations adjacent said first location not having a change in pixel data associated therewith; and,
four locations adjacent said first location having a change in pixel data associated therewith and remaining locations adjacent said four locations adjacent said first location not having a change in pixel data associated therewith.

9. The method as described in claim 8 wherein said method is performed for each of said plurality of corresponding locations.

10. The method as described in claim 8 wherein said method is used in conjunction with a method of compressing said data associated with said corresponding data locations.

11. The method as described in claim 8 wherein said method is used in conjunction with a frame differencing technique.

12. The method as described in claim 7 wherein said method is used in conjunction with a method of compressing said data associated with said corresponding data locations.

13. The method as described in claim 7 wherein said method is used in conjunction with a frame differencing technique.

14. A method of filtering a signal comprising a sequence of frames used in conjunction with a frame differencing technique, each of said frames comprising a plurality of corresponding data locations, each of said corresponding data locations having data associated therewith, wherein said signal comprises an image signal and said data comprises pixel data, said method comprising the steps of:
forming a data structure having a plurality of data structure locations, said data structure locations corresponding to at least a portion of said corresponding data locations in said frames, wherein based upon a comparison of a first and a second frame in said sequence of frames, a first binary state is placed in each of said data structure locations where said data has changed between said first and said second frames for that corresponding location, and a second binary state is placed in each of said data structure locations where said data has not changed between said first and said second frames for that corresponding location;

comparing a pattern formed by said first and said second binary states in a portion of said data structure proximate each of said locations having said first binary state with at least one predetermined reference pattern of said first and said second binary states; and disregarding each of said changes in said data associated with each of said data locations corresponding to a data structure location having said first binary state if said pattern proximate said location having said first binary state matches one of said at least one predetermined reference pattern by copying said pixel data associated with each of said corresponding locations in said first frame to each of said corresponding locations in said second frame for each of said corresponding locations having said change in said pixel data to be disregarded.

15. The method as described in claim 14 wherein a determination of whether a change in said pixel data has occurred is performed by computing a difference between grey scale values associated with said pixel data, comparing said difference to a grey scale threshold value and determining that said change has occurred if said difference exceeds said grey scale threshold value, if said pixel data comprises grey scale values, and wherein a determination of whether a change in said pixel data has occurred is performed by computing a sum of squares of a difference between between each of a plurality of color component values associated with said pixel data, comparing said sum with a color threshold value and determining that said change has occurred if said difference exceeds said color threshold value, if said pixel data comprises color component values.

16. The method as described in claim 14 wherein when each of said locations having said first binary state is compared to said at least one reference pattern said location having said first binary state is a center location and wherein said at least one predetermined reference pattern of said first and said second binary states comprises the patterns of:

all locations adjacent said center location having said second binary state;

one location adjacent said center location having said first binary state and remaining locations adjacent said center location and adjacent said one location adjacent said center location having said second binary state; and, two locations adjacent said center location having said first binary state and remaining locations adjacent said center location and adjacent said two locations adjacent said center location having said second binary state.

17. The method as described in claim 16 wherein said at least one predetermined reference pattern of said first and said second binary states further comprises the patterns of:

three locations adjacent said center location having said first binary state and remaining locations adjacent said center location and adjacent said three locations adjacent said center location having said second binary state; and, four locations adjacent said center location having said first binary state and remaining locations adjacent said four locations adjacent said center location having said second binary state.

18. A method of filtering a signal comprising a sequence of frames, each of said frames comprising a plurality of corresponding data locations, each of said corresponding data locations having data associated therewith, said method comprising the steps of:

forming a data structure having a plurality of data structure locations, said data structure locations corresponding to at least a portion of said corresponding data locations in said frames, wherein based upon a comparison of a first and a second frame in said sequence of frames, a first binary state is placed in each of said data structure locations where said data has changed between said first and said second frames for that corresponding location, and a second binary state is placed in each of said data structure locations where said data has not changed between said first and said second frames for that corresponding location;

comparing a pattern formed by said first and said second binary states in a portion of said data structure proximate each of said locations having said first binary state with at least one predetermined reference pattern of said first and said second binary states; and disregarding each of said changes in said data associated with each of said data locations corresponding to a data structure location having said first binary state if said pattern proximate said location having said first binary state matches one of said at least one predetermined reference pattern;

wherein said signal comprises an image signal and said data comprises pixel data; and wherein when each of said locations having said first binary state is compared to said at least one reference pattern said location having said first binary state is a center location and wherein said at least one predetermined reference pattern of said first and said second binary states comprises the patterns of:

all locations adjacent said center location having said second binary state;

one location adjacent said center location having said first binary state and remaining locations adjacent said center location and adjacent said one location adjacent said center location having said second binary state; and two locations adjacent said center location having said first binary state and remaining locations adjacent said center location and adjacent said two locations adjacent said center location having said second binary state.

19. The method as described in claim 18 wherein said at least one predetermined reference pattern of said first and said second binary states further comprises the patterns of:

three locations adjacent said center location having said first binary state and remaining locations adjacent said center location and adjacent said three locations adjacent said center location having said second binary state; and, four locations adjacent said center location having said first binary state and remaining locations adjacent said four locations adjacent said center location having said second binary state.

20. The method as described in claim 19 wherein said method is used in conjunction with a method of compressing said data associated with said corresponding data locations.

21. The method as described in claim 19 wherein said method is used in conjunction with a frame differencing technique.

22. The method as described in claim 18 wherein said method is used in conjunction with a method of compressing said data associated with said corresponding data locations.

23. The method as described in claim 18 wherein said method is used in conjunction with a frame differencing technique.

* * * * *

UNITED STATES PATENT AND TRADEMARK OFFICE
CERTIFICATE OF CORRECTION

PATENT NO : 5,664,029
DATED : September 2, 1997
INVENTOR(S) : Callahan et al.

It is certified that error appears in the above-identified patent and that said Letters Patent is hereby corrected as shown below:

Claim 1, column 10, line 48, delete "wherein said signal comprises an".
Claim 1, column 10, line 49, delete "image signal and said data comprises pixel data,".
Claim 1, column 10, line 58, "and said second" should read - -and second- -.
Claim 1, column 11, line 3, "frame." should read - -frame;- -.
Claim 1, column 11, after line 3 insert - -wherein said signal comprises an image signal and said data comprises pixel data.- -.
Claim 2, column 11, line 13, "between between each" should read - -between each- -.
Claim 14, column 12, line 54, "data locations having" should read - -locations having- -.
Claim 14, column 12, line 54, "therewith, wherein" should read - -therewith, - -.
Claim 14, column 12, line 55, delete "said signal comprises an image signal and said data com-" .
Claim 14, column 12, line 56, delete "prises pixel data,".
Claim 14, column 13, line 11, "reference pattern by" should read - -patterns by- -.
Claim 14, column 13, line 15, "disregarded." should read - -disregarded;- -.
Claim 14, column 13, after line 15 insert - -wherein said signal comprises an image signal and said data comprises pixel data.- -.
Claim 15, column 13, line 25, "between between each" should read - -between each- -.
Claim 18, column 13, line 63, "data locations having" should read - -locations having- -.
Claim 18, column 14, line 22, "reference pattern;" should read - -patterns;- -.

Signed and Sealed this

Sixteenth Day of November, 1999

Attest:

Q. TODD DICKINSON

*Attesting Officer*     *Acting Commissioner of Patents and Trademarks*